(12) United States Patent
Li (10) Patent No.: US 12,540,704 B1
(45) Date of Patent: Feb. 3, 2026

(54) METHOD AND SYSTEM FOR FOLDABLE EQUIPMENT FLOOR STAND

(71) Applicant: Yanwu Li, Zhuhai (CN)

(72) Inventor: Yanwu Li, Zhuhai (CN)

( * ) Notice: Subject to any disclaimer, the term of this patent is extended or adjusted under 35 U.S.C. 154(b) by 0 days.

(21) Appl. No.: 19/077,532

(22) Filed: Mar. 12, 2025

(51) Int. Cl.
*F16M 11/38* (2006.01)
*F24F 1/60* (2011.01)

(52) U.S. Cl.
CPC ............. *F16M 11/38* (2013.01); *F24F 1/60* (2013.01)

(58) Field of Classification Search
CPC ..... A47B 2003/0824; A47B 3/00; A47B 3/08; F16M 11/38; F24F 1/60
USPC .... 248/188.6, 166, 434, 168, 169, 170, 171, 248/439; 108/115, 124, 125, 129
See application file for complete search history.

(56) References Cited

U.S. PATENT DOCUMENTS

| | | | | |
|---|---|---|---|---|
| 5,141,197 A * | 8/1992 | Mackaay | ................... | B60P 3/32 280/765.1 |
| 5,509,361 A * | 4/1996 | Chen | ................... | A47B 3/0912 403/231 |
| 7,014,030 B2 * | 3/2006 | Hendzel | ................... | F16M 1/00 198/368 |
| 2003/0051642 A1 * | 3/2003 | Tseng | ................... | A47B 3/14 108/127 |
| 2021/0222823 A1 * | 7/2021 | Choi | ................... | F16M 11/38 |

* cited by examiner

*Primary Examiner* — Alfred J Wujciak
(74) *Attorney, Agent, or Firm* — Hawaii Patent Services; Nathaniel K. Fedde; Kenton N. Fedde (57) ABSTRACT

The present invention provides the foldable equipment floor stand, comprising a mounting base and two groups of foldable support mechanism installed on both sides of the bottom of the mounting base, wherein two groups of the foldable support mechanism are arranged opposite to each other, and each group of the foldable support mechanism can rotate toward one side of the other group of the foldable support mechanism. Each group of the foldable support mechanism comprises the first connecting rod as well as two supporting rods. The first connecting rod is connected between the two supporting rods. The two supporting rods are hinged to the bottom of the mounting base. The present invention can reduce the difficulty of assembly, shorten time of assembly and reduce consumption of manpower and material resources.

9 Claims, 8 Drawing Sheets

METHOD AND SYSTEM FOR FOLDABLE EQUIPMENT FLOOR STAND

TECHNICAL FIELD

The present invention relates to the technical field of support equipment, and to the foldable equipment floor stand and using method thereof particularly.

TECHNICAL BACKGROUND

In the process of installing various equipment as well as facilities, as an important support structure, convenience of bracket installation directly affects efficiency and cost of the engineering. Currently, many equipment brackets available on the market face challenges during the installation. Since most equipment brackets such as air-conditioning brackets are delivered in parts, those parts need to be assembled onsite during assembly. This makes the entire installation process complicated and takes a long time. The equipment brackets also have many parts, so they require collaboration among multiple people to complete the assembly, requiring more manpower as well as material resources. This will not only increase the cost but also reduce work efficiency.

Therefore, the existing assembly method of equipment bracket has technical problems such as great difficulty and time in assembly, as well as high consumption of manpower and material resources. It is urgent to provide a foldable equipment floor stand that can simplify the assembly process and reduce the difficulty of assembly.

SUMMARY OF THE INVENTION

The present invention provides a foldable equipment floor stand and method thereof, which effectively solves technical problems of existing equipment brackets such as great difficulty and time in assembly, and high consumption of manpower and material resources.

In order to solve the above-mentioned technical problems, the present invention provides a foldable equipment floor stand comprised of a mounting base and two groups of foldable support mechanisms installed on both sides of the bottom of the mounting base, wherein the two groups of foldable support mechanism are opposite to each other. Each group of the foldable support mechanism can be rotated toward one side of the other group of foldable support mechanism, wherein each group of foldable support mechanism is comprised of a first connecting rod as well as two supporting rods, wherein the first connecting rod is connected between both supporting rods, and wherein both supporting rods are respectively hinged to the bottom of the mounting base. Preferably, the mounting base is comprised of two mounting frames arranged parallel to each other, wherein the two second connecting rods are connected between the two mounting frames, wherein the connecting groove is respectively provided at both ends of the mounting frame, and wherein the mounting frame is hinged to a supporting rod through the connecting groove.

Preferably, the limiting rod is detachably connected between each of the second connecting rods as well as the adjacent first connecting rod, wherein one end of the limiting rod is connected to the second connecting rod, and wherein the other end extends obliquely downward to the side which is close to the first connecting rod and is connected to the first connecting rod.

Preferably, the limiting rod is detachably connected to one side of the connecting groove on each of the mounting frames, wherein the end of the limiting rod away from mounting frame extends obliquely downward toward the side close to the supporting rod and is connected to the supporting rod detachably.

Preferably, each of the second connecting rods is rotatably connected to the adjacent first connecting rod with a foldable limiting rod, wherein one end of the limiting rod is hinged to the second connecting rod, and wherein the other end extends obliquely downward to the side which is close to the first connecting rod and is hinged to the first connecting rod.

Preferably, the limiting rod is comprised of a first movable block, second movable block and elastic component, wherein one end of the first movable block is hinged to the second connecting rod and the edge of the other end is hinged to the edge of the end of the second movable block, wherein one end of the second movable block away from the first movable block is hinged to the first connecting rod, wherein one end of the elastic component is fixed to one end of the second movable block close to the first connecting rod, and wherein the other end extends to one end of the first movable block close to the second movable block and is fixedly connected to the first movable block.

Preferably, the mounting base also comprises two sliding rods which are located at the upper end of both mounting frames, wherein both ends of each sliding rod are slidably connected to both mounting frames respectively and can move left and right in the length direction of the mounting frame, and wherein each sliding rod is provided with a mounting groove on the side away from the mounting frame.

Preferably, both ends of the sliding rod are movably connected with the limiting component respectively.

Preferably, the adjusting component is threadedly connected to one end of a supporting rod away from the connecting groove, wherein the mounting hole is formed on the side wall of one end of the supporting rod close to the adjusting component.

The present invention further provides a method for using the foldable equipment floor stand which is applied to the foldable equipment floor stand, comprised of the following steps:

1) the unfolding foldable support structure, rotating the both groups of the foldable support mechanism around their hinge point with the mounting base in the direction away from each other until the supporting rod and mounting base are perpendicular to each other,
2) the installing limiting rod, i.e. installing the limiting rod between each second connecting rod as well as adjacent first connecting rod, or installing the limiting rod on the side of the connecting groove on each mounting frame, and making the end of the limiting rod away from the mounting frame to extend obliquely downward to the side which is close to the supporting rod and to connect to the supporting rod, or simultaneously unfolding the foldable limiting rod connected between the second connecting rod and the first connecting rod when unfolding the foldable support structure, and
3) the installing sliding rod, placing the two ends of the sliding rod at designated positions on both mounting frames, then respectively buckling both limiting components on side of the two mounting frames that are away from each other and then fixing the limiting component to the sliding rod with bolts.

The beneficial effects of the technical solutions of the present invention compared with prior art are as follows:
1) The present invention provides the foldable equipment floor stand which is provided with the mounting base and two groups of the foldable support mechanism, and each group of the foldable support mechanism comprises the first connecting rod and two supporting rods. Through coordinated use of above parts, not only can the difficulty for assembly of the foldable equipment floor stand be alleviated, but the time for assembly can be shortened and the consumption of manpower as well as material resources can be reduced, but also space can be saved, thus facilitating storage and transportation. Specifically, by providing two groups of the foldable support mechanism to support the mounting base and to enable each group of the foldable support mechanism to rotate toward the side of the other group of the foldable support mechanism, the folding of the foldable equipment floor stand can be achieved. Furthermore, by setting the supporting rod and hingedly connecting the supporting rod to the bottom of the mounting base, when people need to fold up the foldable equipment floor stand, four supporting rods are respectively rotated 90° along their respective hinge points with the mounting base toward the side close to the bottom of the mounting base, thereby folding these four supporting rods. The four supporting rods are at identical horizontal height when being folded, thereby forming the flat stacking surface, so that the multiple foldable equipment floor stands can be placed in a stacked manner after being folded, making full use of the vertical space which is conducive to storage and transportation. When the foldable equipment floor stand is needed, the four supporting rods which are in the folded state are rotated 90° along their respective hinge points with the mounting base to the side away from the bottom of the mounting base to realize unfolding of the four supporting rods, and then the equipment such as the air conditioner outdoor unit, etc. can be installed on the mounting base. Whether folding or unfolding, the foldable equipment floor stand only requires a single person to perform a small number of simple operation procedures to complete. The operation is simple as well as convenient, which can greatly alleviate the difficulty of assembly, effectively shorten the time of assembly, and greatly reduce consumption of manpower and material resources. At the same time, by setting the first connecting rod, the two supporting rods of the same group of foldable support mechanism can be physically connected to form a linkage structure. When unfolding the foldable equipment floor stand, only one of the supporting rods needs to be operated. Through the connecting action of the first connecting rod, the other supporting rod will also be flipped in the identical direction synchronously, ensuring that both supporting rods are folded or unfolded simultaneously and evenly. It is also equivalent to adding additional mechanical support between both supporting rods, thereby enhancing overall rigidity and stability of the structure of the supporting rod. Especially when the foldable equipment floor stand is unfolded and used, the first connecting rod can help to disperse load borne by mounting base.

2) The present invention provides foldable equipment floor stand which is used to install equipment such as an air conditioner outdoor unit on the foldable equipment floor stand by arranging two sliding rods on the mounting frame. At the same time, since the sliding rod can move left and right along the length direction of mounting frame, the distance between both sliding rods can be adjusted to adapt to equipment of different lengths such as an air conditioner outdoor unit, thereby greatly improving the adaptability range of the foldable equipment floor stand. Besides, since the mounting groove is provided on the side of the sliding rods which is away from the mounting frame, each sliding rod is provided with two symmetrical long strip-shaped mounting grooves which can adapt to installation of equipment of different widths such as the air conditioner outdoor unit.

3) The present invention provides a foldable equipment floor stand which not only ensures that the supporting rod of the foldable equipment floor stand always remains in a vertically unfolded state when in use, but also enhances the connection stability between the mounting base as well as the foldable support mechanism, since each of the second connecting rods is detachably connected to the adjacent first connecting rod with a limiting rod, so that the foldable equipment floor stand can better disperse and withstand forces from all directions when carrying the equipment, thereby effectively reducing risk of deformation or shaking of the foldable equipment floor stand due to an uneven force and ensuring that the equipment is placed more safely and reliably.

4) The present invention provides the foldable equipment floor stand. Since each of the mounting frames is detachably connected to the limiting rod on one side of the connecting groove, the limiting rod extends obliquely downward from one end of the mounting frame to the side close to the supporting rod and is detachably connected to the supporting rod, thereby forming a stable triangular structure together with the mounting frame and supporting rod. This can not only ensure that the supporting rod of the foldable equipment floor stand always remains in a vertically unfolded state when in use, but also enhances connection stability between the mounting base and the foldable support mechanism, so that the foldable equipment floor stand can better disperse and withstand forces from all directions when carrying equipment, thereby effectively reducing the risk of deformation or the shaking of the foldable equipment floor stand due to uneven force and ensuring that the equipment is placed more safely and reliably.

5) The foldable equipment floor stand provided by present invention has the foldable limiting rod rotatably connected between each of the second connecting rods and the adjacent first connecting rod, which not only allows the supporting rod of the foldable equipment floor stand to always remain in a vertically unfolded state when in use, but also enhances connection stability between the mounting base and the foldable support mechanism, so that the foldable equipment floor stand better disperses and withstands forces from all directions when carrying equipment, thereby effectively reducing the risk of deformation or the shaking of the foldable equipment floor stand due to uneven force and ensuring that the equipment is placed safely as well as reliably. Furthermore, when the foldable support mechanism is folded or unfolded, the limiting rod can be folded or unfolded at the same time, thereby reducing the steps of installing the limiting rod, making the installation of the foldable equipment floor stand more convenient, greatly reducing the difficulty of assembly, shortening the time of assembly and reducing the consumption of manpower as well as material resources.

DESCRIPTION OF DRAWINGS

To more clearly illustrate technical solutions in embodiments or prior art of the present invention, the accompanying drawings to be used in description of embodiments or prior art will be briefly described below. The accompanying drawings in following description are only some of the embodiments of the present invention, and other accompanying drawings may be obtained based on these drawings by a person of ordinary skill in the art without creative labor.

Among them: 100. Mounting base; 110. Mounting frame; 111. Connecting groove; 120. Second connecting rod; 130. Sliding rod; 131. Mounting groove; 132. Limiting component; 200. Foldable support mechanism; 210. First connecting rod; 220. Supporting rod; 221. Adjusting component; 222. Mounting hole; 230. Limiting rod; 231. First movable block; 232. Second movable block; 233. Elastic component; 300. Air conditioner outdoor unit.

DETAILED DESCRIPTION OF THE EMBODIMENTS

To better understand the purpose, structure, as well as function of the present invention, the foldable equipment floor stand and using method thereof provided by the present invention are further described in detail below in conjunction with the accompanying drawings, so that those skilled in the prior art can better understand the present invention and implement it, but the embodiments are not intended to limit the present invention.

Embodiment 1

Referring to FIGS. 1 to 4, the present embodiment provides the foldable equipment floor stand, comprising the mounting base 100 and both groups of the foldable support mechanism 200 installed on both sides of the bottom of the mounting base 100. The two groups of foldable support mechanism 200 are arranged opposite to each other, and each group of the foldable support mechanism 200 can rotate toward the side of the other group of the foldable support mechanism 200. Each group of the foldable support mechanism 200 comprises the first connecting rod 210 as well as both supporting rods 220, wherein the first connecting rod 210 is connected between the two supporting rods 220, and the two supporting rods 220 are respectively hinged to the bottom of the mounting base 100. The mounting base 100 comprises two mounting frames 110 arranged parallel to each other, and the two second connecting rods 120 are connected between the two mounting frames 110. The connecting groove 111 is respectively provided at both ends of the mounting frame 110, and the mounting frame 110 is hinged to the supporting rod 220 through the connecting groove 111.

Figure 1:
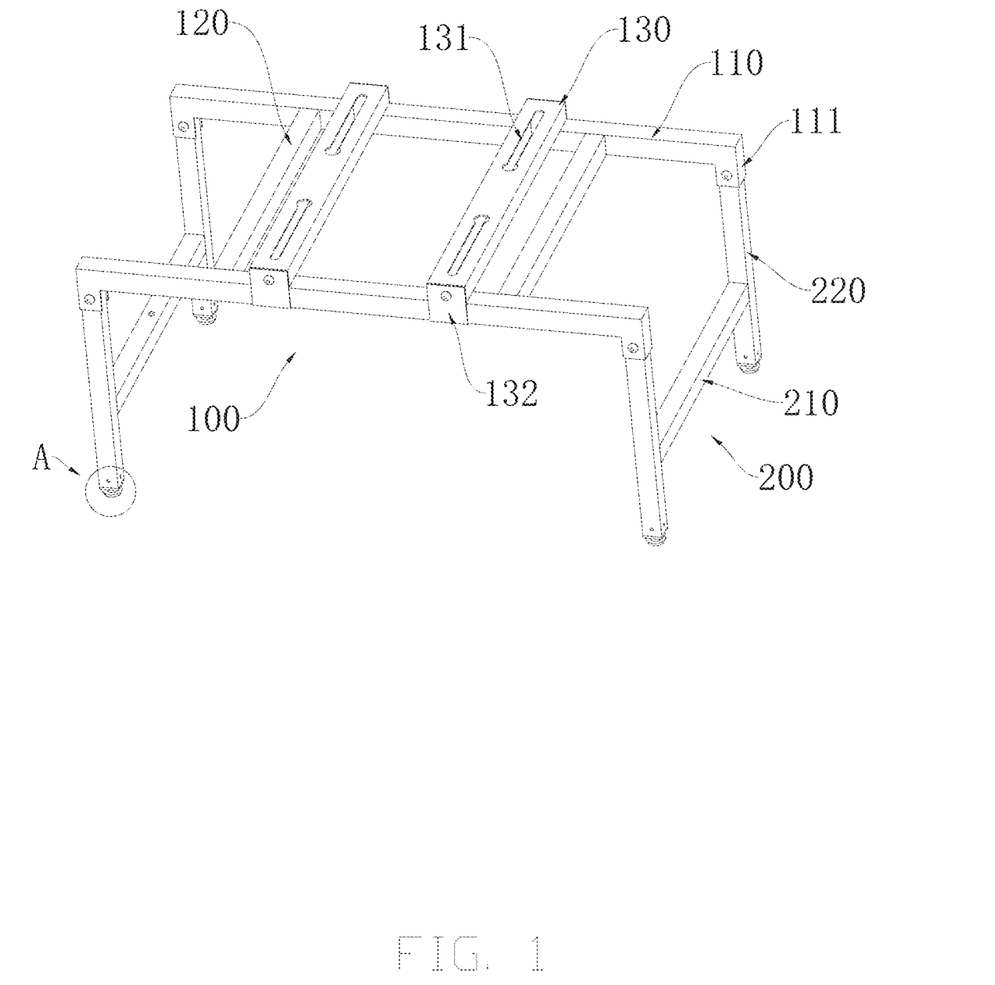
FIG. 1 is a top perspective view, showing the overall structure of the foldable equipment floor stand in Embodiment 1 of the present invention.
Figure 2:
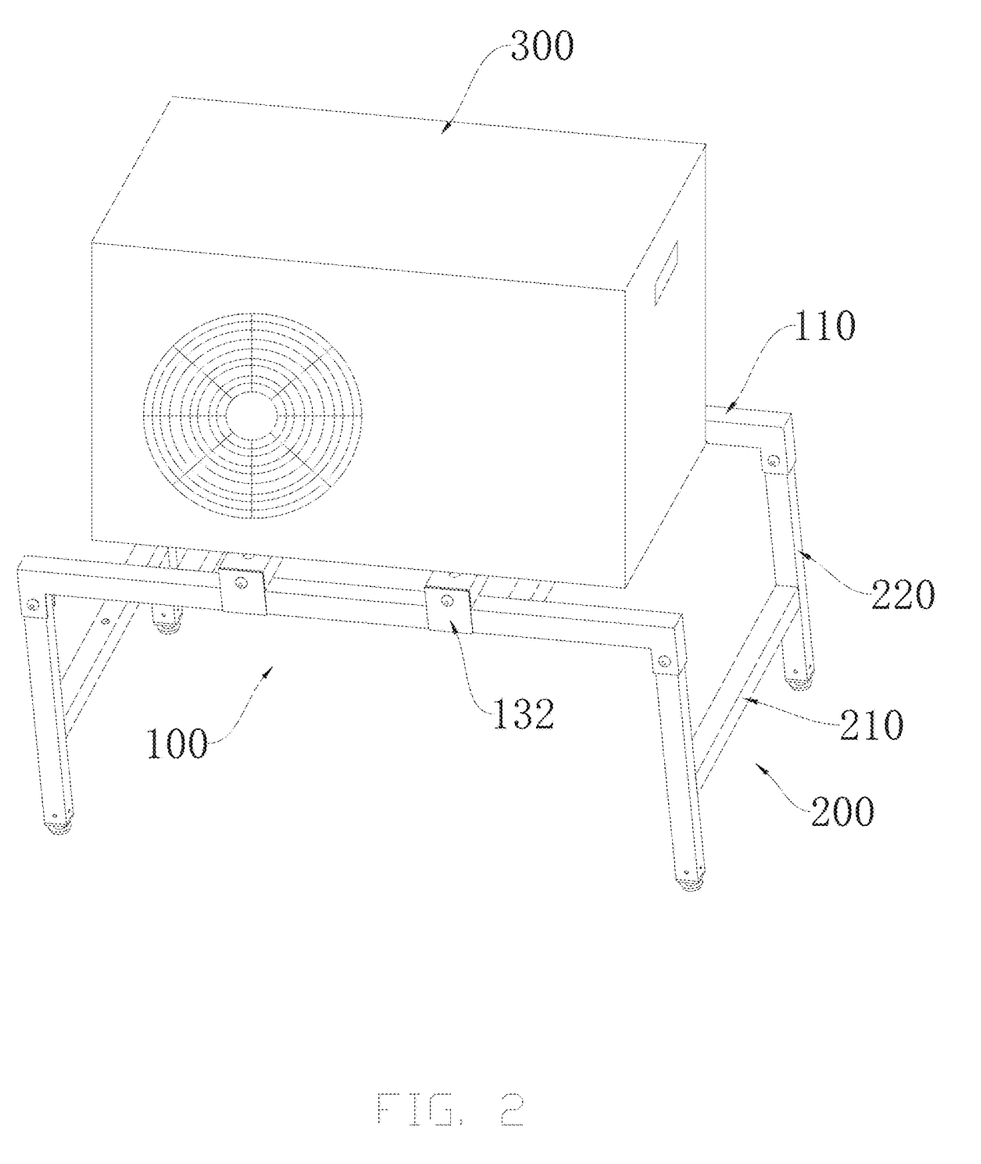
FIG. 2 is another top perspective view, showing the foldable equipment floor stand in using state in Embodiment 1 of the present invention.

Since the mounting base 100 and two groups of foldable support mechanism 200 are provided and each group of the foldable support mechanisms 200 comprises the first connecting rod 210 as well as both supporting rods 220, coordination between the above parts can not only reduce difficulty of assembling the foldable equipment floor stand, shorten time of assembly and reduce consumption of manpower and material resources, but also save space to facilitate storage as well as transportation. Specifically, by providing two groups of the foldable support mechanism 200 to support the mounting base 100 and to enable each group of the foldable support mechanism 200 to rotate toward the side of other group of the foldable support mechanism 200, the folding of foldable equipment floor stand can be achieved.

Furthermore, by providing the supporting rod 220 as well as hingedly connecting the supporting rod 220 to the bottom of the mounting base 100, when the foldable equipment floor stand needs to be folded up, four supporting rods 220 are respectively rotated 90° along their respective hinge points with the mounting base 100 to the side close to the bottom of the mounting base 100 to achieve the folding of the four supporting rods 220. The four supporting rods 220 are at the same horizontal height in the folded state, thereby forming a flat stacking surface, so that the multiple foldable equipment floor stands can be placed in a stacked manner after the folding, thereby making full use of the vertical space which is conducive to storage and transportation. When the foldable equipment floor stand needs to be used, the four supporting rods 220 in the folded state are respectively rotated 90° along their respective hinge point with the mounting base 100 to the side which is away from the bottom of the mounting base 100 to achieve unfolding of the four supporting rods 220, and then the equipment such as the air conditioner outdoor unit 300 etc. can be installed on the mounting base 100. Whether folding or unfolding the foldable equipment floor stand, only a single person needs to perform a small number of simple operations to complete it. The operation is simple as well as convenient, which can greatly reduce the difficulty of equipment assembly, effectively shorten the time of equipment assembly and greatly reduce the consumption of manpower and material resources. At the same time, by setting the first connecting rod 210, both supporting rods 220 of identical group of the foldable support mechanism 200 can be physically connected to form a linkage structure. When unfolding the foldable equipment floor stand, only one supporting rod 220 needs to be operated. Through connection of the first connecting rod 210, the other supporting rod 220 will also be synchronously flipped in the identical direction, ensuring that two supporting rods 220 are folded or unfolded simultaneously and evenly. It is also equivalent to adding additional mechanical support between both supporting rods 220, which enhances the overall rigidity and stability of the structure of the supporting rod 220. When the foldable equipment floor stand is unfolded and used, the first connecting rod 210 can help to disperse the load borne by the mounting base 100.

In a preferred embodiment, the mounting base 100 also comprises both sliding rods 130, which are located at the upper ends of the two mounting frames 110. Both ends of each sliding rod 130 are slidably connected to the two mounting frames 110 respectively and can move left and right along the length direction of the mounting frame 110, and each sliding rod 130 is provided with the mounting groove 131 on the side away from the mounting frame 110. By arranging the two sliding rods 130 on the mounting frame 110, the equipment such as the air conditioner outdoor unit 300 is installed on the foldable equipment floor stand. At the same time, since the sliding rod 130 can move left and right along the length direction of the mounting frame 110, the distance between the two sliding rods 130 can be adjusted to adapt to the equipment of different lengths such as the air conditioner outdoor unit 300, which greatly improves the adaptation range of the foldable equipment floor stand. In addition, since the sliding rod 130 is provided with the mounting groove 131 on the side which is away from the mounting frame 110, each of the sliding rods 130 is provided with two mutually symmetrical long strip-shaped mounting grooves 131, which can adapt to the assembly of equipment of different widths such as the air conditioner outdoor unit 300.

Figure 3:
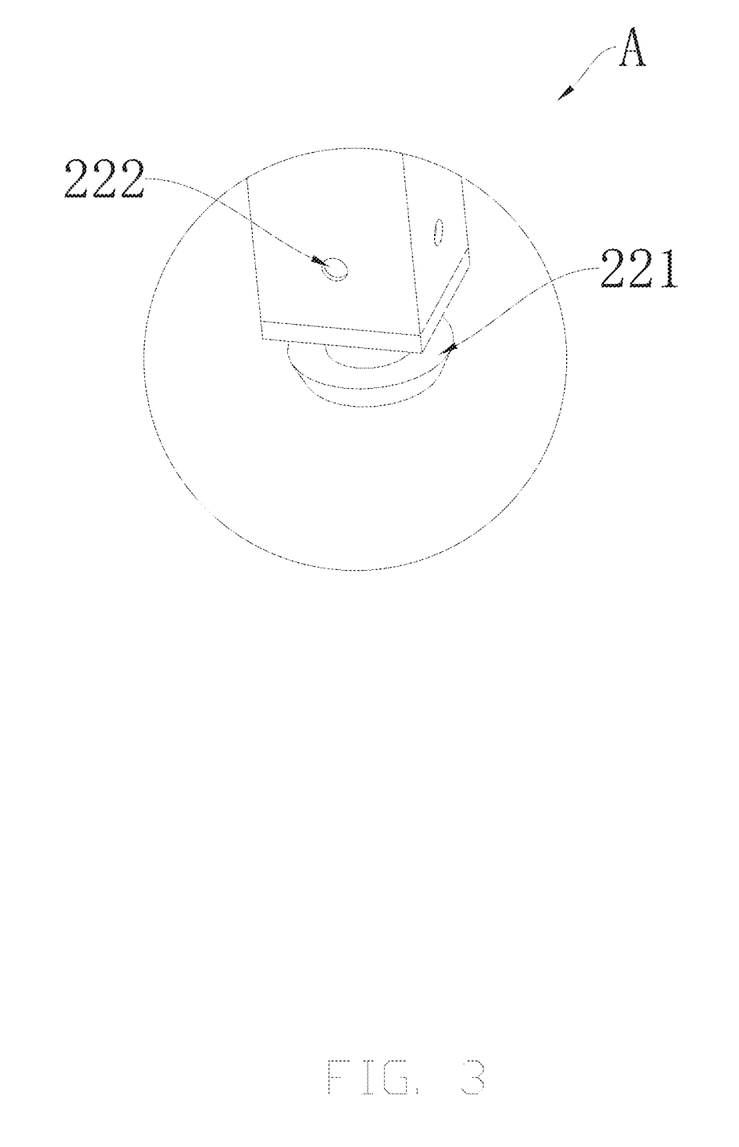
FIG. 3 is an enlarged view of a portion labeled as "A" on FIG. 1.
Figure 4:
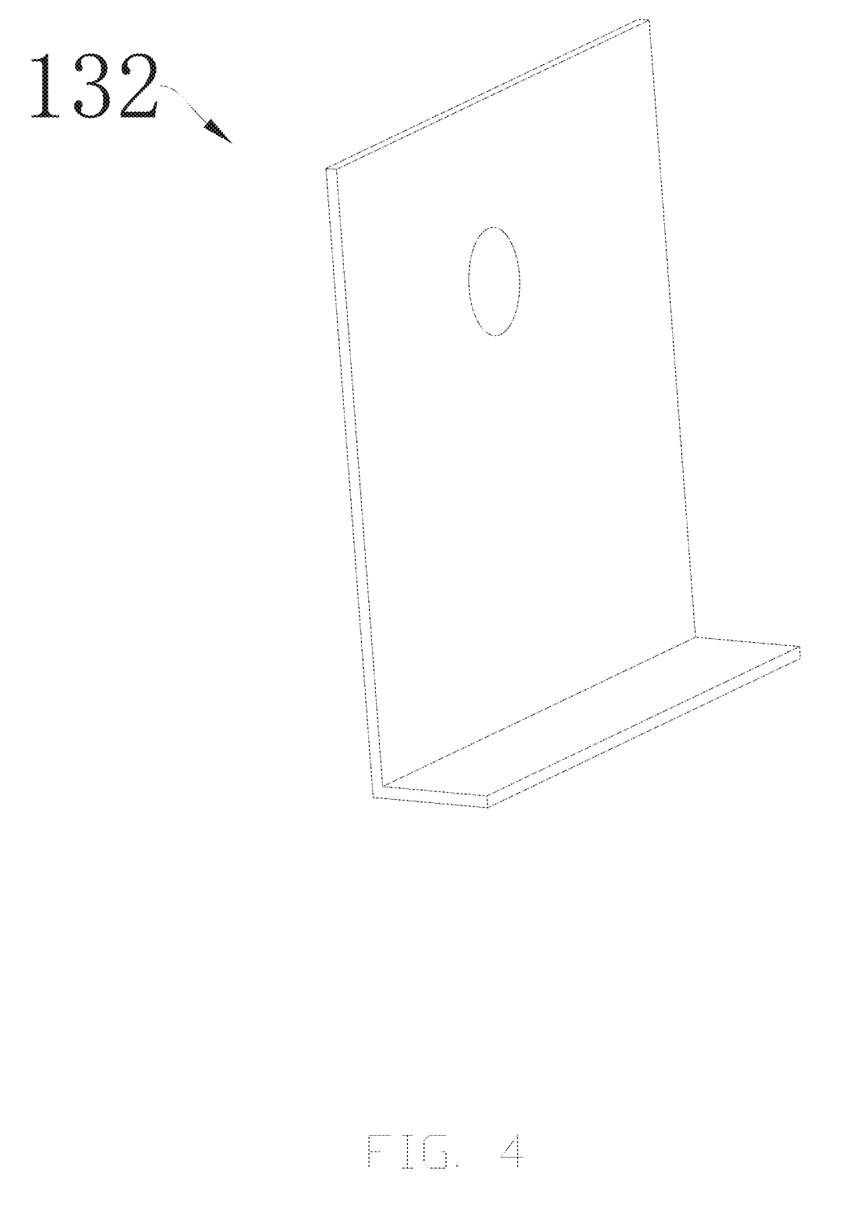
FIG. 4 is a perspective view, showing structure of the limiting component in Embodiment 1 of the present invention.

In a preferred embodiment, limiting component 132 is connected to both ends of the sliding rod 130 movably. Since the limiting component 132 is provided, after distance between the two sliding rods 130 is adjusted to a suitable position, the sliding rod 130 can be fixed on a supporting frame by the limiting component 132. Specifically, the cross section of the limiting component 132 is L-shaped. When fixing the sliding rod 130, both limiting components 132 are respectively engaged with the side of both mounting frames 110 that are away from each other, and the bolt is passed through the through-hole on the limiting component 132 and threadedly connected with the threaded hole on the sliding rod 130. The sliding rod 130 is fixed to the mounting frame 110 by tightening the bolt, or the sliding rod 130 is moved by loosening the bolt, thereby adjusting the distance between the two sliding rods 130.

In a preferred embodiment, adjusting the component 221 is threadedly connected to the end of the supporting rod 220 which is away from the connecting groove 111. Since adjusting the component 221 is provided, the height of the supporting rod 220 can be fine-tuned, so that the foldable equipment floor stand can ensure that the equipment installed on the foldable equipment floor stand remains in a horizontal state when the ground is uneven.

In a preferred embodiment, the mounting hole 222 is provided on the side wall of one end of the supporting rod 220 which is away from the connecting groove 111. The mounting hole 222 can be used to install a fixing angle bracket to fix the foldable equipment floor stand to the ground, or to install a shock absorbing component.

Embodiment 2

Figure 5:
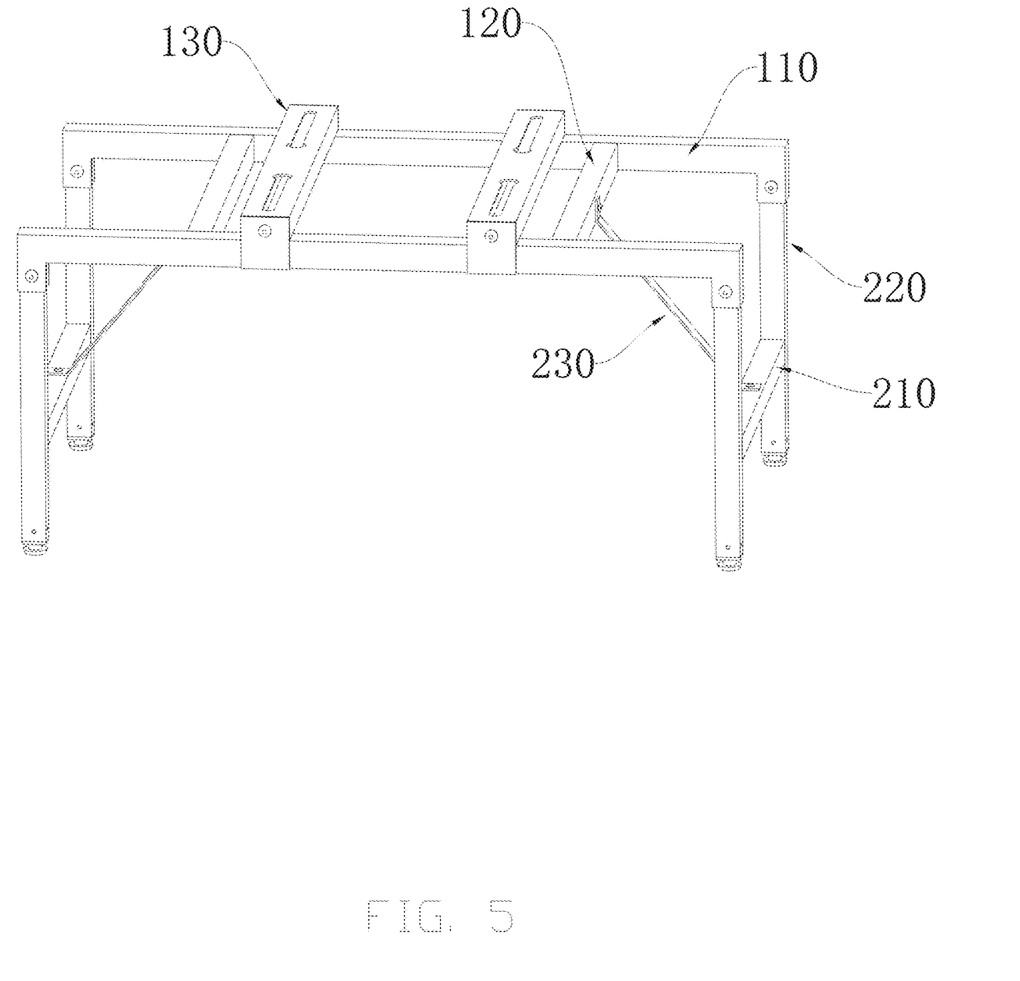
FIG. 5 is another top perspective view, showing the overall structure of the foldable equipment floor stand in Embodiment 2 of the present invention.

Referring to FIG. 5, the present embodiment provides the foldable equipment floor stand, which is different from Embodiment 1 only in that the limiting rod 230 is connected between each of the second connecting rods 120 and the adjacent first connecting rod 210 detachably. One end of the limiting rod 230 is connected to the second connecting rod 120, and the other end extends obliquely downward to the side close to the first connecting rod 210 and is connected to the first connecting rod 210, wherein the detachable connection can be fixed by bolts. Other functions are the same as those of Embodiment 1 and are not repeated here.

Since each second connecting rod 120 is detachably connected to the adjacent first connecting rod 210 with the limiting rod 230, it can not only ensure that the supporting rod 220 can always remain in a vertically unfolded state when the foldable equipment floor stand is in use, but can also enhance connection stability between the mounting base 100 and the foldable support mechanism 200, so that the foldable equipment floor stand can better disperse and withstand forces from all directions when carrying equipment, thereby effectively reducing the risk of deformation or shaking of the foldable equipment floor stand due to uneven force and ensuring that equipment is placed more safely and reliably.

Embodiment 3

Figure 6:
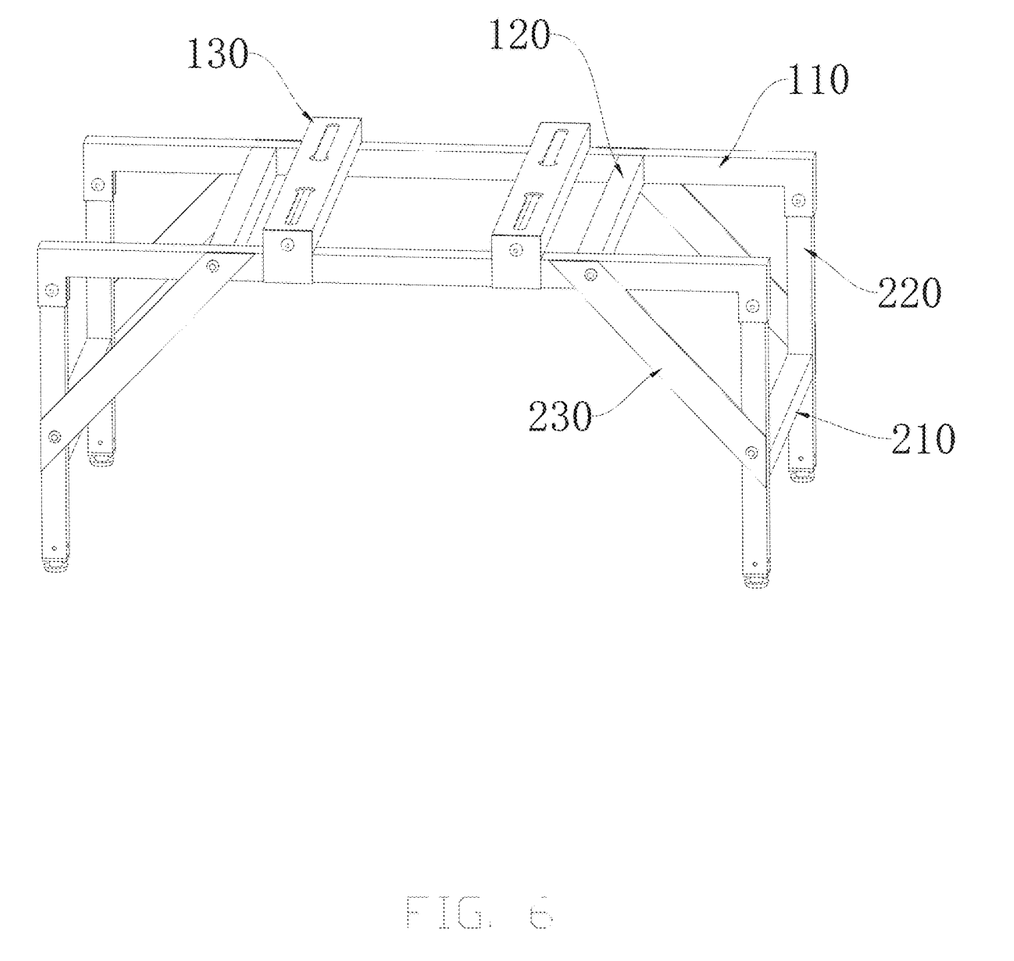
FIG. 6 is another perspective view, showing the overall structure of the foldable equipment floor stand in Embodiment 3 of the present invention.

Referring to FIG. 6, the present embodiment provides the foldable equipment floor stand, which is different from Embodiment 1 only in that the limiting rod 230 is detachably connected to the side of the connecting groove 111 on each mounting frame 110. Limiting rod 230 extends obliquely downward from the end away from the mounting frame 110 to the side which is close to the supporting rod 220 and is detachably connected to the supporting rod 220, wherein a detachable connection can be fixed by bolts. Other functions are the same as those of Embodiment 1 and are not repeated here.

Since each of the mounting frames 110 is detachably connected to the limiting rod 230 on the side of the connecting groove 111, the limiting rod 230 extends obliquely downward from the end which is away from the mounting frame 110 to the side close to the supporting rod 220 and is detachably connected to the supporting rod 220, thereby forming a stable triangular structure with the mounting frame 110 and the supporting rod 220, which not only ensures that the supporting rod 220 always remains in a vertically unfolded state when the foldable equipment floor stand is in use but also enhances the connection stability between the mounting base 100 as well as the foldable support mechanism 200, so that the foldable equipment floor stand can better disperse and withstand forces from all directions when carrying equipment, thereby effectively reducing the risk of deformation or shaking of the foldable equipment floor stand due to uneven force and ensuring that the equipment is placed more safely and reliably.

Embodiment 4

Figure 7:
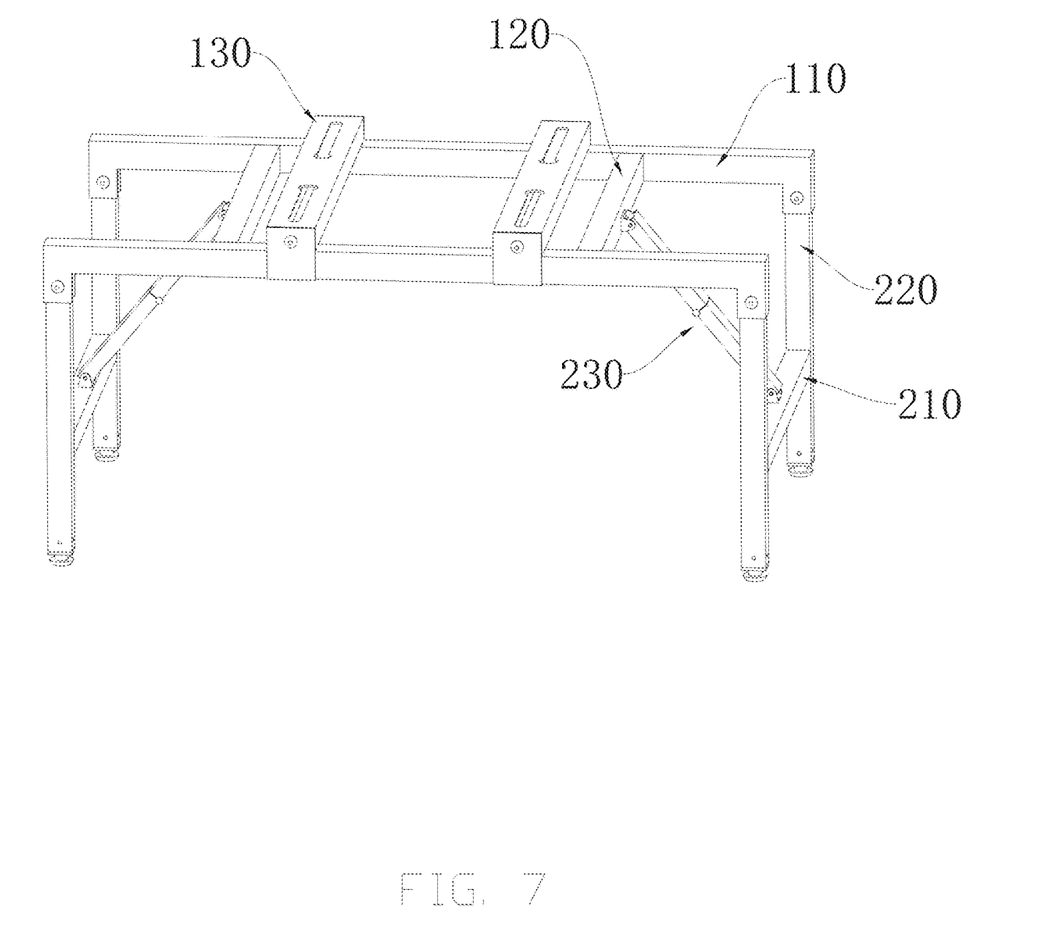
FIG. 7 is another perspective view, showing the overall structure of the foldable equipment floor stand in Embodiment 4 of the present invention.
Figure 8:
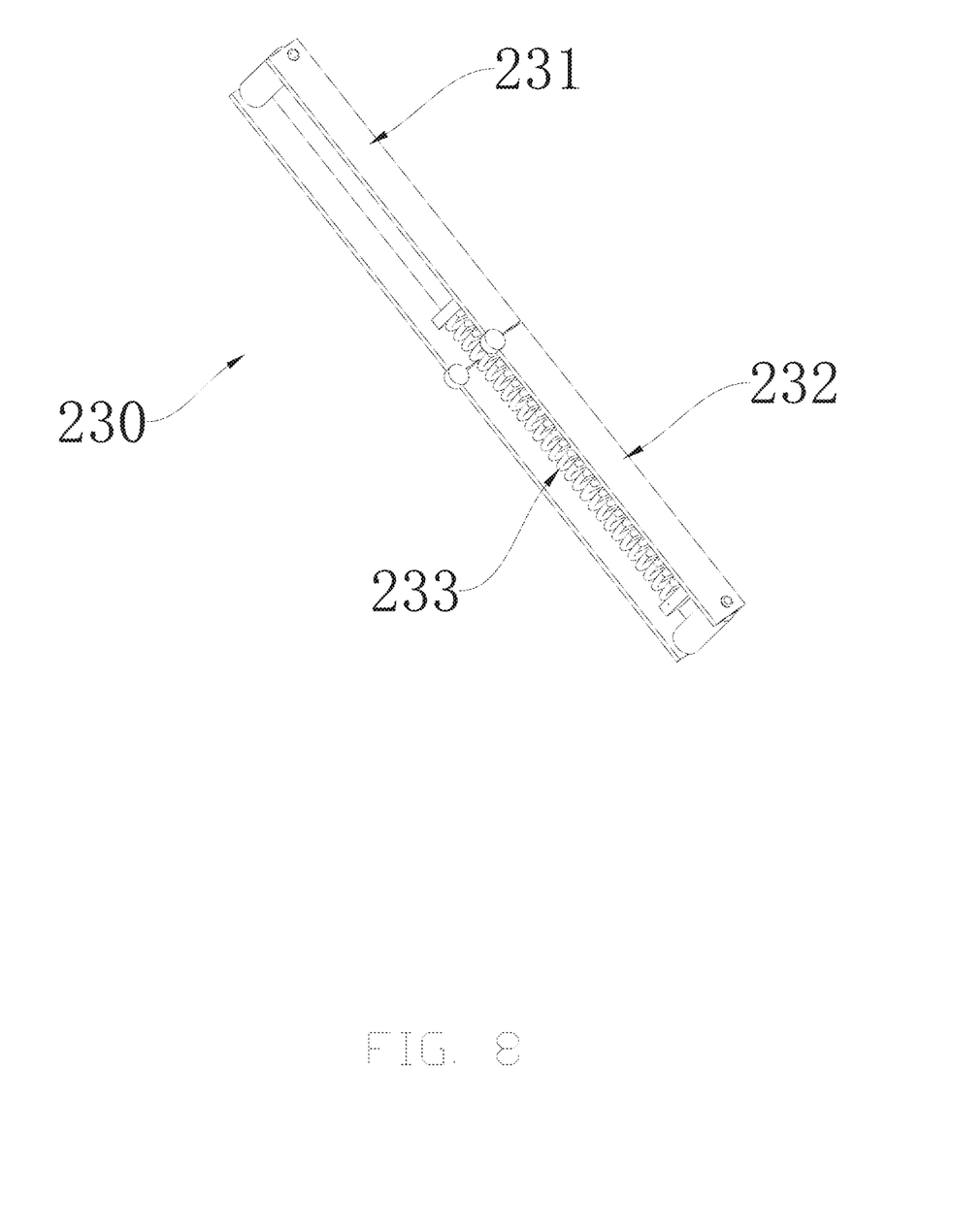
FIG. 8 is perspective view, showing the structure of the limiting rod in Embodiment 4 of the present invention.

Referring to FIGS. 7 and 8, the present embodiment provides the foldable equipment floor stand, which is different from Embodiment 1 only in that the foldable limiting rod 230 is connected between each second connecting rod 120 and the adjacent first connecting rod 210 rotatably. One end of the limiting rod 230 is hinged to the second connecting rod 120, and the other end extends obliquely downward to the side close to the first connecting rod 210 and is hinged to the first connecting rod 210. Other functions are the same as those of Embodiment 1 and are not repeated here.

Since each second connecting rod 120 is detachably connected to the adjacent first connecting rod 210 with the foldable limiting rod 230, it can not only ensure that the supporting rod 220 can always remain in a vertically unfolded state when the foldable equipment floor stand is in use, but also enhances the connection stability between the mounting base 100 and the foldable support mechanism 200, so that the foldable equipment floor stand can better disperse and withstand forces from all directions when carrying equipment, thereby effectively reducing the risk of deformation or shaking of the foldable equipment floor stand due to uneven force and ensuring that equipment is placed more safely and reliably. Moreover, when the foldable support mechanism 200 is folded or unfolded, the limiting rod 230 can be folded or unfolded at same time, thereby reducing the installation steps of the limiting rod 230, making the assembly of the foldable equipment floor stand more convenient, greatly reducing the difficulty of assembly, shortening time of assembly and reducing consumption of manpower and material resources.

In a preferred embodiment, the limiting rod 230 comprises the first movable block 231, the second movable block 232 as well as the elastic component 233. One end of the first movable block 231 is hinged to the second connecting rod 120, and the edge of the other end is hinged to the edge of the end of the second movable block 232. The end of the second movable block 232 away from the first movable block 231 is hinged to the first connecting rod 210. One end of the elastic component 233 is fixed to the end of the second movable block 232 close to the first connecting rod 210, and the other end extends to the end of the first movable block 231 which is close to the second movable block 232 and is fixedly connected to the first movable block 231. Since the first movable block 231, the second movable block 232 as well as the elastic component 233 are provided, coordination between the above parts makes the limiting component 132 be folded or unfolded along with the foldable support mechanism 200 when the foldable support mechanism 200 is folded or unfolded, thereby reducing the difficulty of assembly, shortening the time of assembly and reducing consumption of manpower and material resources.

Embodiment 5

The present embodiment provides the method for using the foldable equipment floor stand which is applied to the foldable equipment floor stand, comprising the following steps:

1) unfolding the foldable support structure, rotating the two groups of the foldable support mechanism 200 respectively around their hinge point with the mounting base 100 in direction which is away from each other until the supporting rod 220 and the mounting base 100 are perpendicular to each other, 2) installing the limiting rod 230, i.e. installing the limiting rod 230 between each second connecting rod 120 and the adjacent first connecting rod 210, or installing the limiting rod 230 on the side of the connecting groove 111 on each mounting frame 110, and making the end of the limiting rod 230 away from the mounting frame 110 to extend obliquely downward to the side close to the supporting rod 220 and to connect to the first connecting rod 210, or simultaneously unfolding the foldable limiting rod 230 connected between the second connecting rod 120 as well as the first connecting rod 210 when unfolding the foldable support structure, and 3) installing the sliding rod 130, respectively placing both ends of the sliding rod 130 at designated positions on both mounting frames 110, then respectively buckling both limiting components 132 on the side of both mounting frames 110 that are away from each other and then fixing the limiting component 132 to the sliding rod 130 with bolts.

It is to be understood that the present invention is described by several embodiments, and it is known to those skilled in the art that various changes or equivalent substitutions may be made to these features and embodiments without departing from the spirit and scope of the present invention. In addition, under the disclosure of the present invention, these features and embodiments may be modified to adapt to specific circumstances and materials without departing from the spirit and scope of the present invention. Therefore, the present invention is not limited by the specific embodiments disclosed herein, it is described to cover any and all modifications and forms which may come within the language and scope of the claims.

What is claimed is:

1. A foldable equipment floor stand comprising:
a mounting base and two groups of a foldable support mechanism installed on both sides of the bottom of the mounting base, wherein the two groups of the foldable support mechanism are arranged opposite to each other, and each group of the foldable support mechanism is constructed to rotate toward one side of the other group of the foldable support mechanism, wherein each group of the foldable support mechanism comprises a first connecting rod and two supporting rods, wherein the first connecting rod is connected between the two supporting rods, and wherein the two supporting rods are respectively hinged to the bottom of the mounting base;
wherein the mounting base comprises two mounting frames arranged parallel to each other, the mounting base comprises two second connecting rods connected between the two mounting frames; and
the mounting base comprises two sliding rods located at the upper end of both mounting frames, wherein both ends of each of the sliding rods are slidably connected to the two mounting frames and are moveable left and right in a length direction of the mounting frame, and wherein each of the sliding rods is provided with a mounting groove on a side away from the mounting frames.

2. A foldable equipment floor stand comprising:
a mounting base and two groups of a foldable support mechanism installed on both sides of the bottom of the mounting base, wherein the two groups of the foldable support mechanism are arranged opposite to each other, and each group of the foldable support mechanism is constructed to rotate toward one side of the other group of the foldable support mechanism, wherein each group of the foldable support mechanism comprises a first connecting rod and two supporting rods, wherein the first connecting rod is connected between the two supporting rods, and wherein the two supporting rods are respectively hinged to the bottom of the mounting base;
wherein the mounting base comprises two mounting frames arranged parallel to each other, the mounting base comprises two second connecting rods connected between two mounting frames, wherein a connecting groove is provided respectively at both ends of the mounting frame, and wherein the mounting frame is hinged to the supporting rod through the connecting groove; and
wherein the mounting base comprises two sliding rods which are located at the upper end of both mounting frames, wherein both ends of each of the sliding rods are slidably connected to the two mounting frames and can move left and right in the length direction of the mounting frame, and wherein each of the sliding rods is provided with a mounting groove on a side away from the mounting frame.

3. The foldable equipment floor stand according to claim 2, wherein a limiting rod is detachably connected between each of the second connecting rods as well as the adjacent first connecting rod, wherein one end of the limiting rod is connected to the second connecting rod, wherein the other end extends obliquely downward to the side close to the first connecting rod and is connected to the first connecting rod.

4. The foldable equipment floor stand according to claim 2, wherein a limiting rod is detachably connected to one side of the connecting groove on each of the mounting frames, wherein the end of the limiting rod away from the mounting frame extends obliquely downward toward the side close to the supporting rod and is detachably connected to the supporting rod.

5. The foldable equipment floor stand according to claim 2, wherein each of the second connecting rods is rotatably connected to the adjacent first connecting rod with the foldable limiting rod, wherein one end of the limiting rod is hinged to the second connecting rod, wherein the other end extends obliquely downward to the side close to the first connecting rod and is hinged to the first connecting rod.

6. The foldable equipment floor stand according to claim 5, wherein the limiting rod comprising a first movable block, a second movable block and an elastic component, wherein one end of the first movable block is hinged to the second connecting rod and the edge of the other end is hinged to the edge of the end of the second movable block, wherein the end of the second movable block away from the first movable block is hinged to the first connecting rod, wherein one end of the elastic component is fixed to one end of the second movable block close to the first connecting rod, and wherein the other end extends to one end of the first movable block close to the second movable block and is fixedly connected to the first movable block.

7. The foldable equipment floor stand according to claim 2, wherein both ends of the sliding rod are movably connected with a limiting component.

8. The foldable equipment floor stand according to claim 2, wherein an adjusting component is threadedly connected to one end of the supporting rod away from the connecting groove, wherein a mounting hole is formed on a side wall of one end of the supporting rod close to the adjusting component.

9. The foldable equipment floor stand according to claim 2, wherein each of the mounting grooves is a keyhole slot.

* * * * *